Patented Feb. 20, 1934

1,947,655

UNITED STATES PATENT OFFICE 1,947,655

INDIGOID VAT-DYESTUFFS AND PROCESS OF MAKING SAME

Jakob Müller, Munchenstein, near Basel, and Robert Stocker, Basel, Switzerland, assignors to firm: Society of Chemical Industry in Basle, Basel, Switzerland No Drawing. Application August 3, 1931, Serial No. 554,940, and in Switzerland August 8, 1930

18 Claims. (Cl. 260—53)

The present invention relates to the manufacture of indigoid vat-dyestuffs. It comprises the process of making these dyestuffs, as well as the dyestuffs themselves.

According to this invention, new unsymmetrical indigoid dyestuffs are made by condensing a body of the general formula:

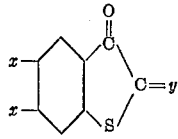

(wherein one $x$ represents alkyl, the other $x$ halogen and $y$ a reactive group, such as O, anil, 2H, NOH, halogen) with a compound of the general formula

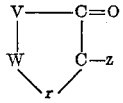

(wherein $z$ represents a reactive group, such as O, halogen, anil, 2H, NOH, and wherein V, W and $r$ represent atoms of which two are carbon atoms adjacent to each other and at the same time appertaining to an aromatic ring system, and the third is NH, C or S), in which two formulæ the groupings

and

must be present in among themselves different stages of oxidation.

Compounds of the first named formula are, for instance, 5-chloro-6-methyl-3-hydroxythionaphthene, 5-chloro-6-ethyl-3-hydroxythionaphthene, 5-bromo-6-methyl-3-hydroxythionaphthene, 5-methyl-6-chloro-3-hydroxythionaphthene, 5-methyl-6-bromo-3-hydroxythionaphthene, the 2-anil and the para-dimethylamino-2-anil of these bodies (which are obtainable for example by condensing the 3-hydroxythionaphthene with an aromatic nitroso-compound), the thionaphthenequinones corresponding with the said 3-hydroxythionaphthenes (obtainable, for example, by treating the 2-anils with a saponifying agent, such as sulfuric acid), the corresponding thionaphthenequinone-2-mono- or 2-dihalides (obtainable for example from the 3-hydroxythionaphthenes by action of halogen or agents yielding halogen), and the thionaphthenequinone-oximes.

From the 3-hydroxythionaphthenes which are substituted in 5- and 6-position by halogen and alkyl, the 5-alkyl-6-halogen-3-hydroxythionaphthene can for example be made in the following manner: 1-alkyl-2-halogen-4-benzene-sulfochloride is reduced, the 1-alkyl-2-halogen-4-thiophenol thus produced condensed in a weakly alkaline solution with monohalogen acetic acid, and the 1-alkyl-2-halogen-4-phenylthioglycollic acid obtained converted into the 5-alkyl-6-halogen-3-hydroxythionaphthene either by the action of agents which eliminate water, such as, for example, sulfuric acid, chloro-sulfonic acid, or, by conversion into the 1-alkyl-2-halogen-4-phenylthioglycollic acid chloride by means of phosphorus trichloride, and acting thereon with agents which eliminate hydrochloric acid, such as aluminium chloride.

The 5-halogen-6-alkyl-3-hydroxythionaphthenes and also the 2-carboxylic acids thereof may be made for example by the following method: 5-alkyl-4-halogen-2-aminobenzene-1-sulfonic acids are diazotized and converted by means of cuprous cyanide into the 5-alkyl-4-halogen-2 cyano-1-benzenesulfonic acids; by the action of phosphorus pentachloride on the latter body the corresponding sulfochlorides are formed. These are reduced by means of zink dust to the thiophenol carboxylic acids, or the amides thereof and saponified, and the latter are condensed with monohalogen acetic acid to form the 5-alkyl-4-halogen-1-phenyl-thioglycol-2-carboxylic acids. By heating these carboxylic acids with alkalies there are obtained the corresponding 5-halogen-6-alkyl-3-hydroxythionaphthenes or their 2-carboxylic acids.

Bodies of the second named formula are, for instance, five-membered condensed ring systems, as for example isatins, naphthisatins, indoxyls, thionaphthenequinones, hydroxythionaphthenes, naphthohydroxythiophenes, acenaphthenequinones and the like, their homologues and substitution products, anil and halides.

The condensation takes place by heating the components in a solvent which may act as condensing agent.

The dyestuffs thus obtained correspond with the general formula

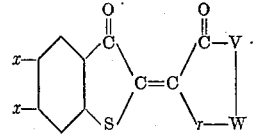

wherein the $x$'s, $r$, V and W have the signification as hereinbefore defined. They form orange to red, violet, brown to black-grey powders, which dissolve in concentrated sulfuric acid to violet, brown and green solutions, yielding with hydrosulfite and caustic soda solution yellow, orange, violet and greenish black vats, which dye cotton fast scarlet to red, violet, brown and grey tints.

These dyestuffs may further be converted into dyestuffs containing more halogen by subsequent halogenation.

The dyestuffs corresponding to the above general formula are characterized by a surprising beauty, high coloring power and very good properties of fastness. Particularly valuable products are obtained by condensing the 3-hydroxythionaphthenes substituted in 5- and 6-position by halogen and methyl, or their reactive 2-derivatives, with naphthohydroxythiophenes or their reactive 2-derivatives.

The new dyestuffs may be converted into their leuco ester salts in the known manner.

The following examples illustrate the invention, the parts being by weight:—

*Example 1*

198 parts of 5-methyl-6-chloro-3-hydroxythionaphthene and 182 parts of acenaphthenequinone are suspended in 4000 parts of alcohol and the suspension is heated to boiling. When condensation is finished the dyestuff of the formula

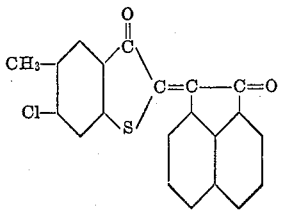

which separates in good yield is filtered, washed and dried. It is a scarlet red powder, soluble in sulfuric acid to a green solution. The dyestuff forms a blue-violet vat and dyes cotton strong scarlet tints of characteristic fastness to chlorine and bowking.

The corresponding dyestuff from 5-methyl-6-bromo-3-hydroxythionaphthene dyes somewhat more yellow tints.

*Example 2*

36.3 parts of the dyestuff obtainable as described in the first paragraph of Example 1 are introduced in 600 parts of nitrobenzene and 16 parts of bromine are added. In the course of 30 hours the temperature is raised gradually to 180° C. After cooling, the dyestuff is filtered, washed with alcohol and dried. It is a red powder, soluble in sulfuric acid to a green solution. It forms a blue-violet vat and dyes cotton scarlet tints which are more yellowish than those produced by the non-brominated dyestuff.

*Example 3*

330 parts of para-dimethylaminoanil of 5-methyl-6-chloro-3 - hydroxythionaphthene and 198 parts of 4-methyl-6-chloro-3-hydroxythionaphthene are suspended in 4000 parts of benzene and the suspension is heated to boiling; after the boiling has continued for a short time the condensation is complete. The new dyestuff of the formula

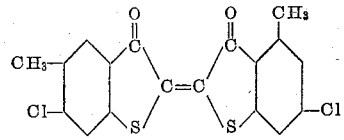

is a bright red powder, soluble in sulfuric acid to a green solution. Its yellow vat dyes cotton strong bluish-rose tints of very good fastness to chlorine and bowking.

Instead of the para-dimethylaminoanil there may be used with similar result the 5-methyl-6-chloro-3-hydroxythionaphthenequinone.

*Example 4*

330 parts of para-dimethylaminoanil of 5-methyl-6-chloro-3 - hydroxythionaphthene and 200 parts of 2:1-naphthoxythiophene are suspended in 4000 parts of alcohol and the suspension is heated to boiling until the condensation of the dyestuff is complete. The whole is filtered and the dyestuff of the formula

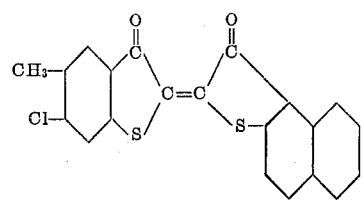

dried. It is a bordeaux red powder and dyes cotton in an orange vat yellowish bordeaux tints, very fast to chlorine, bowking and light.

*Example 5*

305 parts of 5:7-dibromisatin are suspended in 3000 parts of chlorobenzene and the suspension is heated with 229 parts of phosphorus pentachloride. The solution of 5:7-dibromo-isatin chloride thus produced is introduced at 70–80° C. into a solution of 198 parts of 5-chloro-6-methyl-3-hydroxythionaphthene in 2000 parts of chlorobenzene. Formation of the dyestuff begins immediately. After filtering, washing and drying the new dyestuff of the formula.

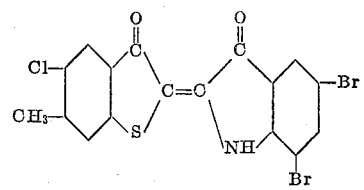

is obtained in the form of a red-violet powder which dissolves in sulfuric acid to a bluish-green solution.

It forms a yellow vat and dyes cotton strong reddish violet tints of good properties of fastness.

*Example 6*

385 parts of the dyestuff made as described in Example 5 are introduced into 6000 parts of nitrobenzene and the whole is mixed with 180 parts of bromine. The mixture is heated in the course of 72 hours at 160° C. The dyestuff is separated by filtering, washing with alcohol and drying. The brominated dyestuff is a blue violet powder soluble in sulfuric acid to a blue-green solution. It yields a yellow vat and dyes cotton bluish violet tints.

Example 7

198 parts of 5-chloro-6-methyl-3-hydroxythionaphthene and 330 parts of para-dimethylaminoanil of 5-chloro-7-methyl-3-hydroxythionaphthene are suspended in 4000 parts of alcohol and the suspension is heated to boiling. After boiling for a short time the condensation is complete. The new dyestuff of the formula

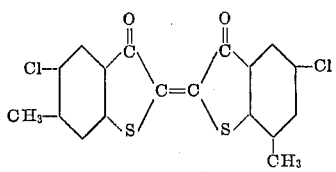

is a violet red powder, soluble in sulfuric acid to a green solution. Its yellow vat dyes cotton strong carmine red tints of pronounced fastness to chlorine, washing and bowking.

Example 8

243 parts of 5-bromo-6-methyl-3-hydroxythionaphthene and 182 parts of acenaphthene-quinone are suspended in 4000 parts of alcohol and the suspension is heated to boiling. When condensation is complete the dyestuff of the formula

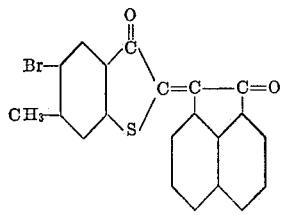

which is formed in good yield, is filtered, washed and dried. It is a scarlet red powder soluble in sulfuric acid to a green solution. It forms a black-violet vat which dyes cotton strong yellowish-scarlet tints of pronounced fastness to chlorine, washing and bowking.

Example 9

330 parts of para-dimethylaminoanil of 5-chloro-6-methyl-3-hydroxythionaphthene and 200 parts of 2:1-naphthoxythiophene are suspended in 4000 parts of alcohol and the suspension is heated to boiling until the condensation to dyestuff is finished. The new dyestuff of the formula

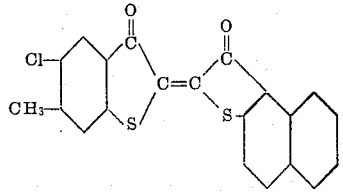

thus obtained is filtered and dried. It is a brown powder which dyes cotton in an orange vat strong yellowish bordeaux tints of very good fastness to chlorine, washing and bowking.

Example 10

374.5 parts of para-dimethylaminoanil of 5-methyl-6-bromo-3-hydroxythionaphthene and 234.5 parts of 1-chloro-2:3-naphthoxythiophene are suspended in 4000 parts of alcohol and the suspension is heated to boiling until the condensation to the dyestuff is complete. The whole is then filtered, washed with alcohol and dried. The new dyestuff of the formula

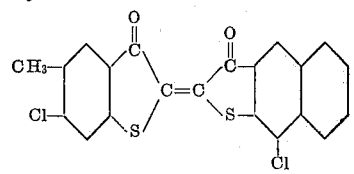

is a red-violet powder which is soluble in sulfuric acid to a green solution. It yields a yellow vat from which cotton is dyed strong violet tints of very good fastness to light, chlorine, washing and keir-boiling.

Example 11

5 parts of the dyestuff obtained as described in Example 5 are made into a paste with 20 parts of caustic soda solution of 33 per cent. strength. 750 parts of water of 70° C. are added, together with 15 parts of sodium hydrosulfite. The whole is allowed to stand for 30 minutes, and then diluted with water to 2000 parts. 100 parts of cotton are entered at 60° C. and after about 10 minutes 50 parts of common salt are added and the dyeing is continued for ½ hour at 60° C. The goods are then removed from the bath, oxidized in air for ½ hour, rinsed and soaped. The cotton is dyed reddish violet shades. For wool, silk and artificial silk the dyeing process must obviously be varied to suit the material.

In the following table, further examples of dyestuffs obtainable according to this invention are set forth:—

| 5-methyl-6-chloro-3-hydroxythionaphthene and: | Color of the dyestuff | Color in sulfuric acid | Color of the vat | Color of cotton dyed |
|---|---|---|---|---|
| I. α-isatin anilide | Heliotrope | Green | Yellow | Heliotrope. |
| II. 5:7-dibromisatin-chloride | Red violet | Green | Yellow | Violet. |
| III. 5:7-dibromisatin | Red | Red-brown | Golden-yellow | Red-brown. |
| IV. Para-dimethylaminoanil of 3-hydroxythionaphthene | Bordeaux red | Green | Yellow | Red. |
| V. Para-dimethylaminoanil of 5-chloro-7-methyl-3-hydroxythionaphthene. | Bluish-red | Green | Yellow | Bluish-red. |
| VI. Para-dimethylaminoanil of 6-ethoxy-3-hydroxythionaphthene. | Bordeaux red | Violet | Yellow | Bluish-red. |
| VII. Para-dimethylaminoanil of 1:2-naphthoxythiophene | Bordeaux red | Dark olive | Orange | Bluish bordeaux. |
| VIII. Para-dimethylaminoanil of 2:3-naphthoxythiophene | Violet | Olive green | Orange | Blue violet. |
| IX. Para-dimethylaminoanil of 1-chloro-2:3-naphthoxythiophene | Red violet | Green | Yellow | Violet. |
| X. α-isatin anilide | Dark violet | Olive green | Yellow | Violet. |
| XI. 5-bromo-α-isatin-chloride | Dark violet | Blue green | Greenish black. | Blue-grey. |
| XII. Para-dimethylaminoanil of 6-chloro-3-hydroxythionaphthene | Bordeaux red | Green | Yellow | Light bordeaux red. |
| XIII. Para-dimethylaminoanil of 4-methyl-6-chloro-3-hydroxythionaphthene. | Violettish red | Green | Yellow | Violettish red. |
| XIV. 5:7-dibromisatin | Red brown | Brown | Yellow | Red. |
| XV. Para-dimethylaminoanil of 1:2-naphthoxythiophene | Reddish brown | Olive green | Orange | Bordeaux red. |
| XVI. Para-dimethylaminoanil of 2:3-naphthoxythiophene | Blackish grey | Green | Yellow | Grey. |

The dyestuff No. I. corresponds with the formula

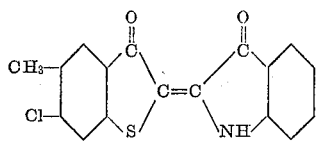

The dyestuff No. III corresponds with the formula

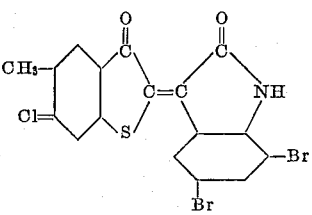

The dyestuff No. VI corresponds with the formula

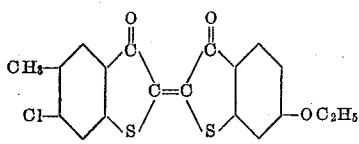

The dyestuff No. XII corresponds with the formula

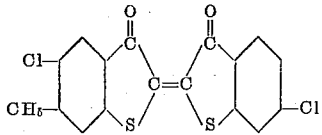

The dyestuff No. XVI corresponds with the formula

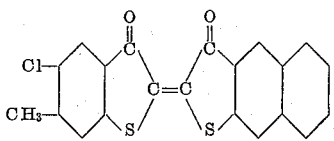

What we claim is:—
1. Process for the production of unsymmetrical indigoid dyestuffs, consisting in condensing bodies of the general formula

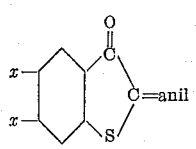

wherein one $x$ stands for methyl and the other $x$ for chlorine, with products having the general formula

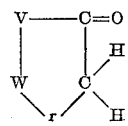

wherein V, W and $r$ represent atoms of which two are carbon atoms adjacent to each other and at the same time appertaining to an aromatic ring system, and the third is NH, C, or S.

2. Process for the production of unsymmetrical indigoid dyestuffs, consisting in condensing bodies of the general formula

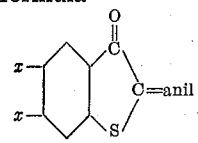

wherein one $x$ stands for methyl and the other $x$ for chlorine, with products having the general formula

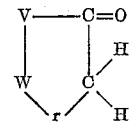

wherein V, W and $r$ represent atoms of which two are carbon atoms adjacent to each other and at the same time appertaining to an aromatic ring system of the naphthalene series, and the third is NH, C, or S.

3. Process for the production of unsymmetrical indigoid dyestuffs, consisting in condensing bodies of the formula

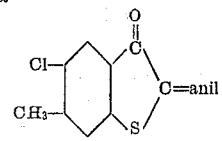

with products having the general formula

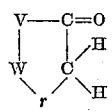

wherein V, W and $r$ represent atoms of which two are carbon atoms adjacent to each other and at the same time appertaining to an aromatic ring system of the naphthalene series, and the third is NH, C, or S.

4. Process for the production of unsymmetrical indigoid dyestuffs, consisting in condensing bodies of the formula

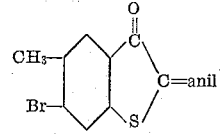

with products having the general formula

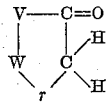

wherein V, W and $r$ represent atoms of which two are carbon atoms adjacent to each other and at the same time appertaining to an aromatic ring system of the naphthalene series, and the third is NH, C, or S.

5. Process for the production of unsymmetrical indigoid dyestuffs, consisting in condensing bodies of the formula

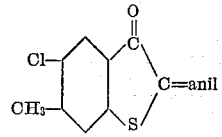

with products having the general formula

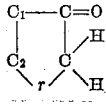

wherein r represents S or NH, and in which the two carbon atoms C₁ and C₂ appertain to an aromatic ring system of the naphthalene series.

6. Process for the production of unsymmetrical indigoid dyestuffs, consisting in condensing the body of the formula

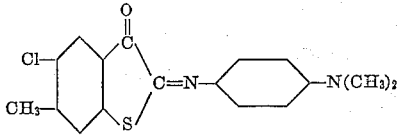

with products having the general formula

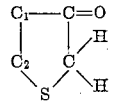

in which the two carbon atoms C₁ and C₂ appertain to an aromatic ring system of the naphthalene series.

7. Process for the production of unsymmetrical indigoid dyestuffs, consisting in condensing the body of the formula

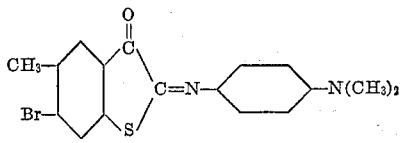

with a product of the formula

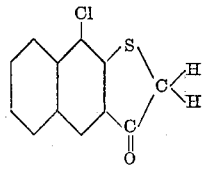

8. Process for the production of unsymmetrical indigoid dyestuffs, consisting in condensing the body of the formula

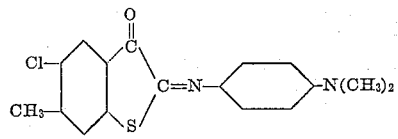

with a product of the formula

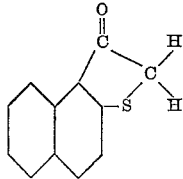

9. The unsymmetrical indigoid dyestuffs of the general formula

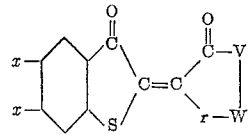

wherein one $x$ stands for an alkyl radical of the lower aliphatic series, the other $x$ for halogen, and $r$, W and V represent atoms of which two are carbon atoms adjacent to each other and at the same time appertaining to an aromatic ring system, and the third is NH, S or C, which products form orange to red, violet, brown to black grey powders, which dissolve in concentrated sulfuric acid to violet, brown and green solutions, yielding with hydrosulfite and caustic soda solution yellow, orange, violet and greenish black vats from which cotton is dyed fast scarlet to red, violet, brown and grey tints.

10. The unsymmetrical indigoid dyestuffs of the general formula

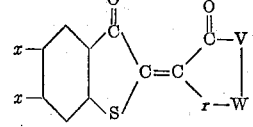

wherein one $x$ stands for an alkyl radical of the lower aliphatic series, the other $x$ for halogen, and $r$, W and V represent atoms of which two are carbon atoms adjacent to each other and at the same time appertaining to an aromatic ring system of the naphthalene series, and the third is NH, S or C, which products form red, violet, brown to black grey powders, which dissolve in concentrated sulfuric acid to green solutions, yielding with hydrosulfite and caustic soda solution yellow, orange, violet and greenish black vats from which cotton is dyed fast scarlet to red, violet and grey tints.

11. The unsymmetrical indigoid dyestuffs of the general formula

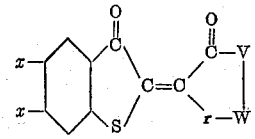

wherein one $x$ stands for methyl, the other $x$ for chlorine, and $r$, W and V represent atoms of which two are carbon atoms adjacent to each other and at the same time appertaining to an aromatic ring system of the naphthalene series, and the third is NH, S or C, which products form red, violet, brown to black grey powders, which dissolve in concentrated sulfuric acid to green solutions, yielding with hydrosulfite and caustic soda solution yellow, orange, violet and greenish black vats from which cotton is dyed fast scarlet to red, violet and grey tints.

12. The unsymmetrical indigoid dyestuffs of the general formula

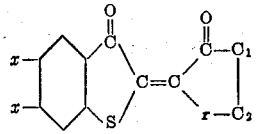

wherein one $x$ stands for methyl, the other $x$ for chlorine, and $r$ represents S or NH, and in which the two carbon atoms C₁ and C₂ appertain to an aromatic ring system of the naphthalene series, which products form red, violet, brown to black-grey powders, which dissolve in concentrated sulfuric acid to green solutions, yielding with hydrosulfite and caustic soda solution yellow, orange, violet and greenish-black vats from which cotton is dyed fast scarlet to red, violet and grey tints.

13. The unsymmetrical indigoid dyestuffs of the general formula

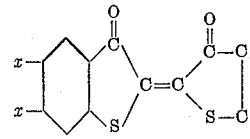

wherein one $x$ stands for methyl and the other $x$ for chlorine, and in which the two carbon atoms C₁ and C₂ appertain to an aromatic ring system of the naphthalene series, which products form red, violet, brown to black-grey powders, which dissolve in concentrated sulfuric acid to green solutions, yielding with hydrosulfite and caustic soda solution yellow, orange, violet and greenish-black vats from which cotton is dyed fast scarlet to red, violet and grey tints.

14. The unsymmetrical indigoid dyestuffs of the general formula

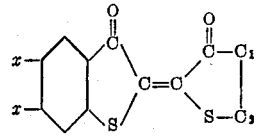

wherein one $x$ stands for methyl and the other $x$ for bromine, and in which the two carbon atoms $C_1$ and $C_2$ appertain to an aromatic ring system of the naphthalene series, which products form red, violet, brown to black-grey powders, which dissolve in concentrated sulfuric acid to green solutions, yielding with hydrosulfite and caustic soda solution yellow, orange, violet and greenish-black vats from which cotton is dyed fast scarlet to red, violet and grey tints.

15. The unsymmetrical indigoid dyestuffs of the general formula

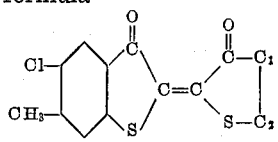

wherein the two carbon atoms $C_1$ and $C_2$ appertain to an aromatic ring system of the naphthalene series, which products form red, violet, brown to black-grey powders, which dissolve in concentrated sulfuric acid to green solutions, yielding with hydrosulfite and caustic soda solution yellow, orange, violet and greenish-black vats from which cotton is dyed fast scarlet to red, violet and grey tints.

16. The unsymmetrical indigoid dyestuffs of the general formula

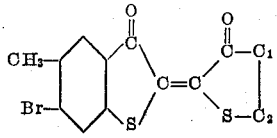

wherein the two carbon atoms $C_1$ and $C_2$ appertain to an aromatic ring system of the naphthalene series, which products form red, violet, brown to black-grey powders, which dissolve in concentrated sulfuric acid to green solutions, yielding with hydrosulfite and caustic soda solution yellow, orange, violet and greenish-black vats from which cotton is dyed fast scarlet to red, violet and grey tints.

17. The unsymmetrical indigoid dyestuff of the formula

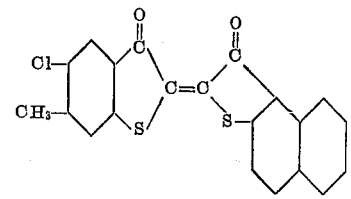

which product forms a bordeaux powder, which dissolves in concentrated sulfuric acid to a green solution, yielding with hydrosulfite and caustic soda solution an orange vat from which cotton is dyed fast yellowish bordeaux tints.

18. The unsymmetrical indigoid dyestuff of the formula

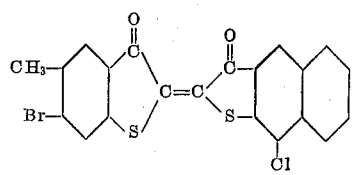

which product forms a red violet powder, which dissolves in concentrated sulfuric acid to a green solution, yielding with hydrosulfite and caustic soda solution a yellow vat from which cotton is dyed fast violet tints.

JAKOB MÜLLER.
ROBERT STOCKER.